(12) United States Patent
White

(10) Patent No.: US 6,989,892 B2
(45) Date of Patent: Jan. 24, 2006

(54) OPTICAL FIBER PROPAGATION TIME MEASUREMENT

(75) Inventor: Bruce T. White, Woodinville, WA (US)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 10/805,874

(22) Filed: Mar. 22, 2004

(65) Prior Publication Data

US 2005/0206878 A1 Sep. 22, 2005

(51) Int. Cl.
*G01N 21/00* (2006.01)

(52) U.S. Cl. .................................................. 356/73.1
(58) Field of Classification Search ................ 356/73.1, 356/460; 370/461–464; 385/15, 24, 11, 31, 385/39, 37
See application file for complete search history.

(56) References Cited

U.S. PATENT DOCUMENTS

| | | | | |
|---|---|---|---|---|
| 4,871,254 A | * | 10/1989 | Lefevre et al. | 356/460 |
| 5,903,691 A | * | 5/1999 | Wisseman et al. | 385/37 |
| 6,256,321 B1 | * | 7/2001 | Kobayashi | 370/464 |

* cited by examiner

*Primary Examiner*—Tu T. Nguyen
(74) *Attorney, Agent, or Firm*—George T. Noe; Richard Koske; James H. Walters

(57) ABSTRACT

An optical fiber propagation time measurement circuit. A light pulse is iteratively transmitted into a near end of a fiber under test (FUT) at a predetermined frequency and detected at a far end of the FUT after a propagation time. A repetitive propagation signal having a predetermined amplitude and a width corresponding the propagation time is developed by detection circuitry. The d.c. voltage average of the propagation signal is determined and used to compute the propagation time since the ratio of the d.c. voltage average to the predetermined amplitude is equal to the ratio of the propagation time to the period of the light pulses.

6 Claims, 1 Drawing Sheet

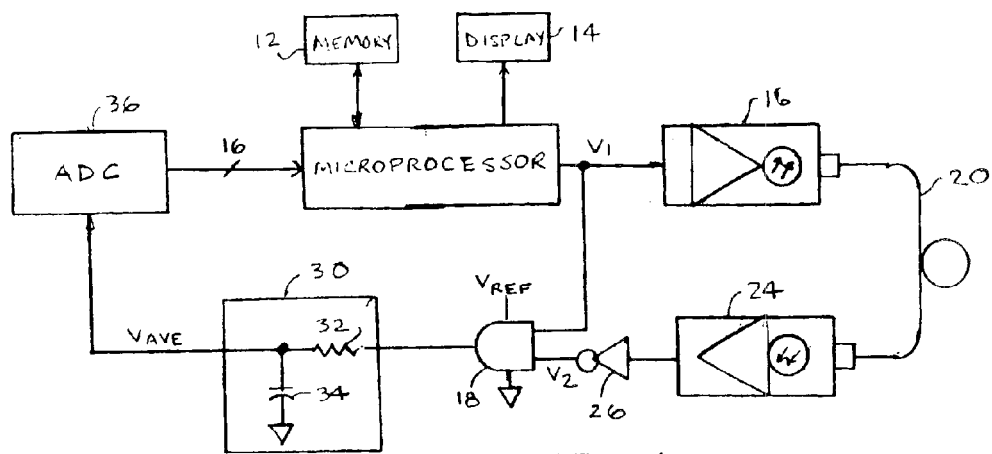
Fig-1
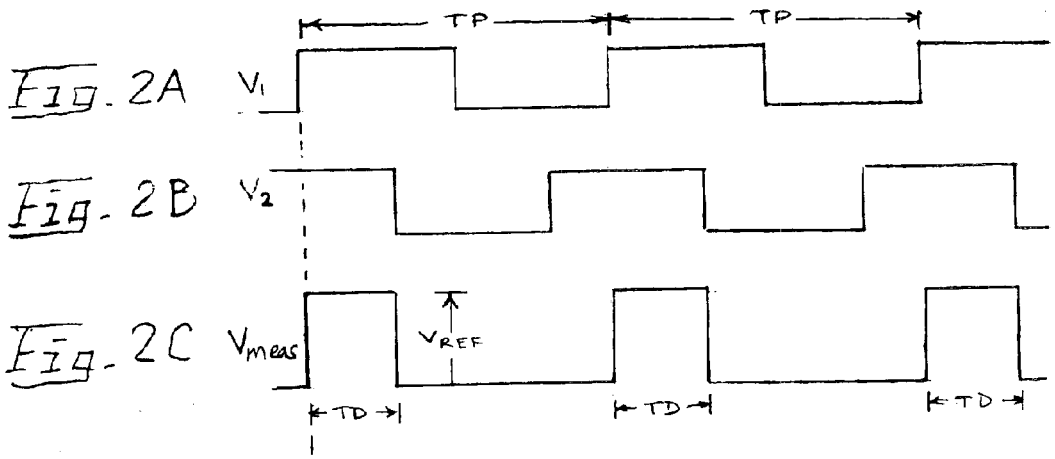
Fig.2A  $V_1$
Fig.2B  $V_2$
Fig.2C  $V_{meas}$

OPTICAL FIBER PROPAGATION TIME MEASUREMENT

BACKGROUND OF THE INVENTION

This invention relates generally to measurement of optical fibers, and in particular to measurement of optical fiber propagation time measurement.

It is well known by those skilled in the art that the time required for light to propagate through the length of an optical fiber is dependent upon the refractive index of the fiber and the wavelength of the light being transmitted. For a commercial grade fused silica optical fiber found in a conventional fiberoptic network, the refractive index is roughly 1.49 and the propagation time is roughly 5.0 ns/m (nanoseconds per meter). There are many well known methods for determining the length of optical fibers and measuring the time of light propagation down a fiber. Instruments such as time-domain reflectometers, for example, are capable of measuring both length and propagation time and displaying a graph of the resultant measurement. Typically, conventional methods are expensive and rely on either high-speed counters or high-speed digital sampling to make the measurements, and therefore there is a limit to the measurement resolution, which in turn contributes to inaccuracies. For example, sampling with a 100-megahertz clock results in 10 nanoseconds between samples. If the propagation time is approximately five ns/m, the sampling uncertainty of ± one clock count means that accuracy of a length measurement is ± two meters. For measurement of long fibers, this may not be a problem. But for short fibers, an accuracy of ± two meters may be unacceptable.

It would be desirable to provide a measurement technique having high accuracy for short (<500 meters) optical fibers, and without the expense, complexity and power consumption of known methods.

SUMMARY OF THE INVENTION

In accordance with the present invention, a simple, low-cost system for measuring optical fibers with a high degree of accuracy is provided.

A light pulse is iteratively transmitted into a near end of a fiber under test (FUT) at a predetermined frequency and detected at a far end of the FUT after a propagation time. A repetitive digital signal having a predetermined amplitude and a width corresponding the propagation time is developed by detection circuitry. The d.c. voltage average of the square wave voltage is determined and used to compute the propagation time since the ratio of the d.c. voltage average to the predetermined amplitude is equal to the ratio of the propagation time to the period of the light pulses.

The preferred embodiment utilizes the internal clock of a microprocessor to generate stimulus voltage pulses which are simultaneously applied to one input of a logic circuit and to an optical transmitter that is coupled to the near end of the FUT. A light detector at the far end of the FUT is also coupled to the logic circuit, and the logic circuit generates a repetitive (at the clock frequency) signal of predetermined amplitude whose width is equal to the propagation time of the FUT. This signal is applied to a filter to obtain the d.c. average voltage. The average voltage is measured by an analog-to-digital converter, which provides the measurement results to the microprocessor, which in turn computes the propagation time and fiber length.

The measurement circuit in accordance with the preferred embodiment may suitably be a portion of a fiber-optic measurement instrument, such as an optical power meter.

Other objects, features, and advantages of the present invention will become obvious to those having ordinary skill in the art upon a reading of the following description when taken in conjunction with the accompanying drawings.

BRIEF DESCRIPTION OF THE DRAWINGS

FIG. 1 is a schematic diagram of a measurement circuit in accordance with the present invention; and FIGS. 2A–2C are waveforms to provide an understanding of the circuit of FIG. 1

DETAILED DESCRIPTION OF THE INVENTION

Referring to FIG. 1 of the drawings, there is shown an optical fiber propagation time measurement circuit in accordance with the present invention. This circuit may suitably be a portion of a measurement instrument, such as an optical power meter. A microprocessor 10 may control several instrument functions, and it is shown connected to a memory 12 and a display device 14. A stimulus pulse output of microprocessor 10 is connected to both an optical transmitter 16, which converts voltage pulses into light pulses, and one input of a logic gate 18. The output of optical transmitter 16 is coupled via an optical coupler to the near end of a fiber under test (FUT) 20. The far end of FUT 20 is coupled via an optical coupler to a detector 24, which converts received light pulses to a voltage signal. The output of detector 24 is coupled through an inverter 26 to a second input of logic gate 18. The output of logic gate 18 is connected to a filter 30, which comprises a resistor 32 and integrating capacitor 34. The output of filter 30 is connected to an input of analog-to-digital converter (ADC) 36, the output of which is coupled to microprocessor 10.

It should be pointed out that the components of the measurement circuit of FIG. 1 are commercially available as off-the-shelf parts, and so parts can easily be selected without undue experimentation by one having ordinary skill in the art once the concept of the invention is understood.

Microprocessor 10 includes an internal clock which produces repetitive stimulus pulses V1, which are shown in FIG. 2A. In the preferred embodiment, stimulus pulses V1 are produced at a 200 kilohertz rate. From the well-known period (P)-frequency (F) relationship P=1/F, the time period (TP) of each pulse is five microseconds. The stimulus pulses are applied iteratively to optical transmitter 16, which in turn iteratively generates light pulses that are transmitted into the near end of FUT 20.

Referring for the moment to the waveforms of FIGS. 2A and 2B, note that when a stimulus pulse is generated, that is, when V1 goes high, both inputs of logic gate 18, which is an AND gate in this embodiment, are both high, causing the output of logic gate 18 to go high in response to stimulus pulse V1. It should be pointed out that other logic circuits, such as a flip-flop or other bistable circuit, could easily be substituted for the AND gate to perform the same function, with perhaps added complexity and power consumption. Another alternative would be to implement the logic circuit in a field programmable gate array (FPGA).

After some time delay (TD), the light pulse has propagated the length of FUT 20 and arrives at detector 24. The detected light pulse is amplified and applied via inverter 26 to logic gate 18. This is seen as a negative-going voltage at the input of logic gate 18, causing the output thereof to go negative. The resultant rectangular-wave pulse Vmeas having a width TD as shown in FIG. 2C is iteratively applied to filter 30, which produces a d.c. average ($V_{AVE}$) of the Vmeas pulses.

A predetermined voltage is selected for the maximum output voltage $V_{REF}$ of logic gate 18. Because TD is a ratio of TP, that is, the time delay period is a ratio of the period of one cycle of stimulus pulse V1, then $V_{AVE}$ is the same ratio to $V_{REF}$. Mathematically, $TD/TP=V_{AVE}/V_{REF}$. This leads to $TD=TP(V_{AVE}/V_{REF})$. If $V_{REF}$ is selected to be same value as the reference voltage for ADC 36, then time delay TD can be measured directly by ADC 36 as time delay TD=time period TP TD ($N_{COUNTS}/N_{MAX}$), where $N_{COUNTS}$ is the number of counts produced by ADC 36, and $N_{MAX}$ is the number of full-scale counts of ADC 36. In the preferred embodiment, ADC 36 has a reference voltage of +3.3 volts, and so this is the value chosen for $V_{REF}$ as the maximum output of logic gate 18. As will be seen, this will allow microprocessor 10 use the ADC 36 results to calculate propagation time without using a scale factor.

Also, in this particular embodiment, ADC 36 is a 16-bit converter with a full-scale count of 65,536 counts. Theoretical resolution provided by ADC 36 is $(1/65,536) \times 5$ $\mu S=76$ picoseconds. As a practical matter, however, noise and filter ripple have to be taken into account. Standard measurement techniques can be used to reduce the effects of noise and ripple. These techniques include averaging multiple readings of the filtered voltage $V_{AVE}$, and auto-zeroing and calibration to cancel circuit offset voltages.

Once the average voltage has been measured, the measurement result may be utilized by microprocessor 10 to compute the propagation time TD from the ratios described above. Also, the length of the fiber may easily be computed using the refractive index of the FUT. These computed values may be stored in memory 12, and also may be displayed on display device 14.

By increasing the frequency of the stimulus pulses V1 with attendant appropriate selection of filter components, shorter fiber links may be measured with a high degree of accuracy.

While I have shown and described the preferred embodiment of my invention, it will be apparent to those skilled in the art that many changes and modifications may be made without departing from my invention in its broader aspects. It is therefore contemplated that the appended claims will cover all such changes and modifications as fall within the true scope of the invention.

What I claim as my invention is:

1. A method of measuring propagation time of an optical fiber, comprising the steps of:
   (a) repetitively transmitting at a predetermined frequency a light pulse into a near end of said optical fiber and detecting said light pulse after a propagation time at a far end of said optical fiber;
   (b) generating from said detected light pulse a propagation signal having a predetermined voltage amplitude and a width corresponding to said propagation time;
   (c) determining the average voltage of said propagation signal, wherein the ratio of the average voltage to the predetermined voltage amplitude is equal to the ratio of said propagation time to a predetermined period of transmitted light pulses;
   (d) measuring said average voltage; and
   (e) computing said propagation time by multiplying said predetermined period by said ratio of measured average voltage to said predetermined voltage amplitude.

2. An apparatus for measuring propagation time of an optical fiber, comprising:
   a source of stimulus pulses repeating at a predetermined frequency and having a predetermined time period between pulses;
   an optical transmitter responsive to said stimulus pulses for repetitively transmitting a light pulse into a near end of said optical fiber;
   an optical detector which detects said light pulse after a propagation time at a far end of said optical fiber and generates a detection signal in response thereto;
   a logic circuit responsive to said stimulus pulses and said detection signal for generating a propagation signal having a predetermined voltage amplitude and a width corresponding to said propagation time;
   an averaging circuit coupled to said logic circuit for determining the d.c. average voltage of said propagation signal, wherein the ratio of the d.c. average voltage to the predetermined voltage amplitude is equal to the ratio of said propagation time to said predetermined period of said stimulus light pulses;
   a measurement circuit coupled to said averaging circuit for measuring said d.c. average voltage; and
   a processor coupled to said measurement circuit for computing said propagation time by multiplying said predetermined period by said ratio of measured average voltage to said predetermined voltage amplitude.

3. An apparatus in accordance with claim 2 wherein said source of stimulus pulses is a clock associated with said processor.

4. An apparatus in accordance with claim 2 wherein said averaging circuit is a filter.

5. An apparatus in accordance with claim 2 wherein said measurement circuit is an analog to digital converter.

6. An optical fiber propagation time measurement circuit, comprising:
   a microprocessor having a clock for generating stimulus signals having a predetermined frequency and a predetermined time period between stimulus signals;
   an optical transmitter coupled to said microprocessor for receiving said stimulus signals and transmitting in response thereto light pulses into one end of an optical fiber;
   a detector coupled to an opposite end of said optical fiber for detecting after a propagation time said light pulses and generating detection signals in response thereto;
   a logic circuit responsive to both said stimulus signals and said detection signals and generating a propagation signal having a predetermined amplitude and a width corresponding to said propagation time;
   a filter coupled to said logic circuit for generating a d.c. average voltage proportional to said propagation time; and
   an analog to digital converter for measuring said d.c. average voltage,
   wherein said microprocessor is coupled to said analog to digital converter and computes said propagation time as a function of a ratio of measured d.c. average voltage to said predetermined amplitude.

* * * * *